United States Patent [19]

Grosch et al.

[11] Patent Number: 5,004,249

[45] Date of Patent: Apr. 2, 1991

[54] FLAT GASKET AND PROCESS FOR ITS PRODUCTION

[75] Inventors: Peter Grosch, Finningen; Gerhard Haas, Munich; Ingo Kremer, Senden, all of Fed. Rep. of Germany

[73] Assignee: Reinz-Dichtunga-Gesellschaft mbH, Neu-Ulm, Fed. Rep. of Germany

[21] Appl. No.: 308,522

[22] Filed: Feb. 10, 1989

[30] Foreign Application Priority Data

Feb. 12, 1988 [DE] Fed. Rep. of Germany ....... 3804436

[51] Int. Cl.⁵ .................. F02F 11/00; F16J 15/00; B23P 15/06
[52] U.S. Cl. .................. 277/207 R; 29/888.07; 277/227; 277/235 R; 277/235 B
[58] Field of Search .................. 29/156.6, 156.61; 277/235 B, 180, 207 R, 235 R, 235 B, 227

[56] References Cited

U.S. PATENT DOCUMENTS

| | | | |
|---|---|---|---|
| 2,127,372 | 8/1938 | Victor et al. | 277/235 B |
| 3,519,279 | 7/1970 | Wagner | 277/180 |
| 4,428,593 | 1/1984 | Pearlstein | 277/235 B |
| 4,591,166 | 5/1985 | Atkinson et al. | 277/235 B |

FOREIGN PATENT DOCUMENTS

| | | | |
|---|---|---|---|
| 1215459 | 4/1966 | Fed. Rep. of Germany | 277/235 B |
| 57-179469 | 11/1982 | Japan | 277/235 B |
| 60-237267 | 4/1985 | Japan | 277/235 B |
| 2091824 | 8/1982 | United Kingdom | 277/235 B |

Primary Examiner—Allan N. Shoap
Assistant Examiner—Scott Cummings
Attorney, Agent, or Firm—Fleit, Jacobson, Cohn, Price, Holman & Stern

[57] ABSTRACT

A flat gasket, e.g. a cylinder head gasket of an internal combustion engine is described, which has through openings with metallic U-borders. The outer surface of at least one of the U-legs is provided with a structure that allows a residual quantity of an impregnating agent with which the soft material of the gasket is impregnated, to remain adhering in such a uniform manner that, after crosslinking, an adequate microsealing and macrosealing is ensured. In the unloaded state, as a result of the surface tension of the impregnating agent, the structure ensures that said agent continues to adhere in finely divided form with a convex meniscus.

14 Claims, 2 Drawing Sheets

FLAT GASKET AND PROCESS FOR ITS PRODUCTION

BACKGROUND OF THE INVENTION

The invention relates to a flat gasket, e.g. a cylinder head gasket for an internal combustion engine, as well as to a process for its production, with at least one through opening provided with a metallic border resting on the opening edge and having a U-shaped cross-section and treated with an impregnating agent solution.

Such gaskets are frequently produced from a soft material on a sheet metal carrier. The gasket material must deform to such an extent under the sealing pressure that on fitting, the adaptation to the sealing faces necessary for sealing is obtained. When used as a cylinder head gasket, the metal border has the function of shielding the soft material against the very hot combustion gases. It must also provide a seal against the gases which are under a high pressure. The cross-sectionally U-shaped borders bent over the opening edge or rim serve to produce a locally increased surface compression for sealing against the high combustion chamber pressures. As is known, in the combustion chamber area much higher pressures are required than in the case of sealing oil and coolants.

In order to ensure an adequate microsealing and macrosealing during the first starting revolutions of a new internal combustion engine the surfaces of the border facing the engine block and cylinder head are covered with elastomeric coatings, which have to be applied in complicated, separate operations. Their basic composition often comprises a silicone-based elastomer, which crosslinks under heat action. The impregnating agents used for treating the flat gasket after stamping and bordering have a similar composition and serve as binders.

A simultaneous coating of the border and impregnation of the soft material has hitherto failed in that during the dripping process following impregnation, uncontrolled residual drip formation and accumulations on the smooth metal surface of the border are unavoidable. Therefore separate cleaning operations for the border are required, in order to obtain a clean surface as a base for a uniform coating thickness of the following elastomer coating. As the cleaning process requires both the dissolving of the accumulations in a solvent and a reliable wiping off, this operation involves relatively high costs.

SUMMARY OF THE INVENTION

The problem of the invention is to provide a flat gasket of the aforementioned type, whose manufacture is much less cost intensive, whilst giving equally good sealing characteristics.

This problem is solved in that at least one of the U-legs of the border is at least zonally provided on its outer surface with a structure, whose shape and level difference are dimensioned in such a way that the impregnating agent solution in the unstressed state is held in the structure as a result of its surface tension with an outwardly curved meniscus.

Thus, it is a basic idea of the invention that the effective surface of the border is structured in such a way that a residual quantity of the impregnating agent remains in finely divided and uniformly adhering form, so that following crosslinking an adequate microsealing and macrosealing is ensured, whilst preventing an uncontrolled accumulation of residual quantities. As the surface tension of the impregnating agent solution is known or can be readily determined, the size of the recesses can be chosen in planned manner with respect to the agent used.

The invention has the advantage that there is no need for the hitherto required intermediate stage of cleaning the border faces, whilst obviating the hitherto required subsequent coating process and at the same time the depressions can be produced in a relatively simple manner. The further advantages obtained that the inventive flat gasket can be used with a very good sealing action in the case of internal combustion engines, in which the facing surfaces to be sealed are not made from different metals and are e.g. in the form of a grey cast iron construction. The surface contour of the border in conjunction with the finely divided impregnating agent outward curvatures, as a result of the increased friction, together with the not additionally coated residual surface of the gasket, prevents a transverse movement of the engaging surfaces, but still ensures the necessary fine sealing action. This result is not only achieved after a given running-in time of the particular engine, but also immediately following installation, which can be proved by a high pressure action with a test gas. The prevention of a transverse movement is particularly significant with special engine constructions, e.g. a V-engine with a mounted V-shaped distributor, because transverse forces can occur during assembly.

Although the advantages of the invention are particularly marked in the case of flat gaskets with a soft sealing material, it is also fundamentally suitable for metal-based flat gaskets, which can be made from different sheet steel layers and a bordering of the passages.

In connection with the production process, in which a bent sheet metal strip is shaped by means of a pressing tool to a flange serving as a border, the problem is solved in that the structure is produced by a corresponding shaping out of the pressing tool, at the same time as forming the flange.

This procedure has the advantage that during the production of the structure, no additional working step is required. The tool serves both as a press die and also a pressing tool.

To reduce the pressing pr punching forces it is advantageous for the border to be formed from a steel sheet coated with a soft metal. In particularly preferred manner the coating is of aluminium.

A particularly uniform distribution of the adhering droplets is achieved through the structure comprising offset, juxtaposed crater-like depressions and elevations. Alternatively a good sealing action can also be obtained in that the structure comprises at least one preferably wedge-shaped or U-shaped groove running parallel to the opening rim.

For example, in the case of electroerosive working of the tool irregular, juxtaposed elevations and depressions are formed similar to a sandpaper surface, so that the elastomeric sealing layer is formed from a plurality of outwardly curved points or spots, which are anchored in the structure.

The production of a sealing film is further aided in that the structure comprises juxtaposed elevations and depressions. In this way a type of mountain range is formed, in which the anchoring of the sealant is particularly well ensured.

It is not necessary for the entire surface of the border to be provided with a structure. It can also be advantageous for reducing the sliding characteristics for the structure to have at least one strip of predetermined width on the particular surface of one or both U-legs. It is advantageous for producing several successively arranged sealing zones, to juxtapose several such strips in spaced manner.

Additionally or alternatively it can also be adequate for the structure to be present at predetermined points along the opening rim. This measure makes it possible to take account of particularly critical sealing points in an individual manner.

BRIEF DESCRIPTION OF THE DRAWINGS

The invention is described in greater detail hereinafter relative to non-limitative embodiments and the attached drawings, wherein show.

DESCRIPTION OF THE PREFERRED EMBODIMENTS

Figure 1:
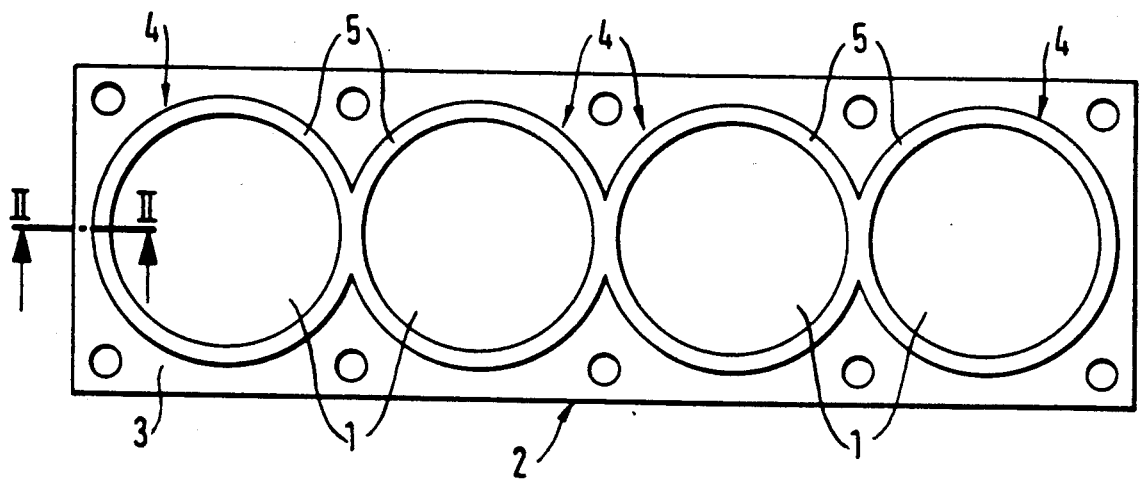
FIG. 1 diagrammatically a plan view of a flat gasket.

FIG. 1 shows a cylinder head gasket with four through openings 1 as an example for a flat gasket, given the overall reference numeral 2. The flat gasket comprises a conventional union of a soft material 3 on an inner sheet steel carrier. The soft material 3 is provided in known manner with an impregnating solution of a silicone-based elastomer crosslinking under heat action.

For sealing the combustion chamber passages, the circular through openings 1 are provided with metal borders 4, which are engaged on the opening rims. The borders 4 have a U-shaped cross-section with two legs 5, between which the soft material 3 is pressed along the through opening 1. In FIG. 1 it is possible to see one of the legs 5 running horizontally in the drawing plane, whereas the other leg is concealed.

Figure 2:
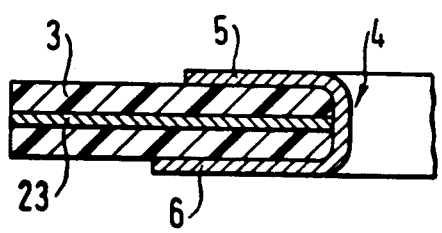
FIG. 2 diagrammatically a cross-section through a border of a through opening of the flat gasket according to FIG. 1.

FIG. 2 illustrates a partial cross-section along section line II—II through the flat gasket 2. The cylinder head or engine block-side leg 5 and 6 are structured on their outer surface, as will be explained in greater detail hereinafter relative to FIGS. 1 to 6. A sheet metal carrier for the soft material 3 is designated 23.

Figure 3:
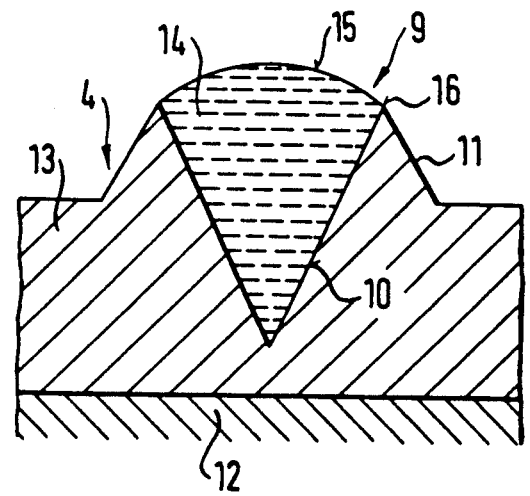
FIGS. 3 and 4 in each case diagrammatically a surface cross-section of the border according to FIG. 2.

The structure can comprise wedge-shaped depressions 10 and elevations 11, as shown in FIG. 3 for a single example. The depression 10 and elevation 11 can be given a crater shape with a roughly circular rim or in elongated trench-like manner. It is important for a predetermined area to be covered on the surface of the particular U-leg 5,6 at right angles to the edge of the through opening 1, either through displaced crater-like depressions 10 and/or elevations 11, or by trench-like depressions 10 and/or web-like elevations 11. The elevations 11 can be formed by piling up the material of border 4 at the edges.

The construction of depression 10 and elevation 11 is assisted by the border 4 comprising a steel sheet 12 with an aluminium coating 13.

The aforementioned impregnation of the soft material 3 takes place after the punching of the structure in the outer surfaces of legs 5,6, the punching process taking place in one operation with the pressing in of the border 4, which can also be called a flange, in the flat gasket 2. As a result of the structure, a residual quantity of the impregnating agent solution 14 adheres to the U-legs 5,6 and, after crosslinking, forms a sealing layer. The diameter and level differences of the structure 9 are such that in the unstressed state and as a result of its surface tension, the impregnating agent solution is kept in uniformly distributed manner and a meniscus 15 is formed, which is outwardly curved over the edge 16 of depression 10 or elevation 11. Thus, the capillarity of the impregnating agent solution 14 is utilized.

Figure 4:
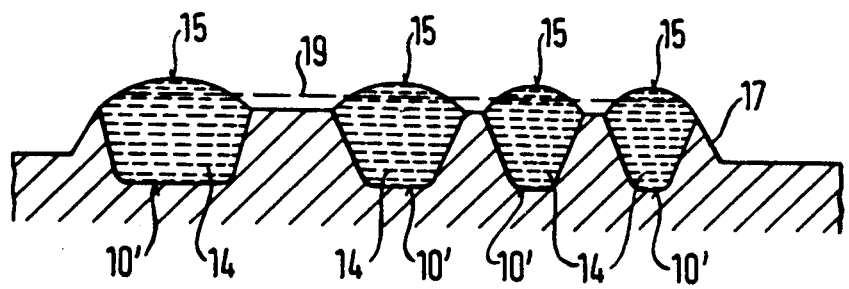

FIG. 4 illustrates the formation of a plateau-like elevation 17 for structuring the outer surfaces of legs 5,6. Within the plateau 17 are provided several juxtaposed rows of depressions 10' with a U-shaped cross-section. The spacing between the depressions 10' is such that the impregnating agent solution 14 of adjacent depressions 10' is linked to form a closed sealing film, as soon as the associated meniscus 15 is flattened by pressure action along the broken line 19. During the fitting of the flat gasket, a corresponding pressure is produced at its intended point when the flat gasket has been inserted between the surfaces to be sealed. A closed, all-round bead is formed by levelling following the complete polymerization of the impregnating agent solution.

Figure 5:
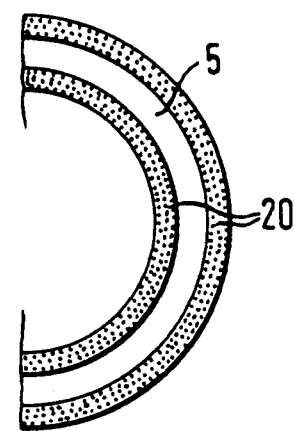
FIGS. 5 and 6 in each case diagrammatically a plan view of the border according to FIG. 2.

By means of a sector-like cutout of leg 5 in FIG. 5, a structure pattern is reproduced, which comprises two spaced, concentric circular rings 20 with in each case a plurality of crater-like, reciprocally displaced depressions and elevations, which are in each case represented as a dot. As a result of this distribution in patterned and unpatterned areas, on the one hand the necessary minimum roughness for preventing transverse movements at the sealing point and on the other hand the desired microsealing and macrosealing are obtained.

Figure 6:
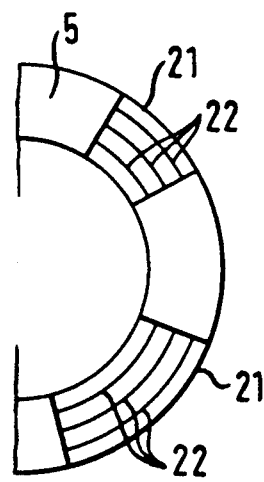

In a further patterning example, FIG. 6 shows ring portion-like areas 21 on leg 5 with concentric, segmental trenchs and webs 22.

What we claim is:

1. A flat gasket, with at least one through opening, which is provided with a metallic border resting on a rim of the opening, the border having a U-shaped cross-section with opposing legs, wherein at least one of the legs (5,6) of the border (4) is provided at least zonally on its outer surface with a structure having at least one depression containing an impregnating agent solution said depression being formed with a shape and level difference such that in the unloaded state and as a result of its surface tension, the impregnating agent solution (14) is kept in the depression with outwardly curved meniscus (15).

2. A flat gasket according to claim 1, wherein the border (4) comprises a steel sheet (12) coated with a soft metal.

3. A flat gasket according to claim 2, wherein the coating is of aluminium (13).

4. A flat gasket according to claim 1, wherein the structure comprises displaced, juxtaposed crater-like depressions (10) and elevations (11).

5. A flat gasket according to claim 1, wherein the structure comprises at least one groove running parallel to the opening rim.

6. A flat gasket according to claim 5, wherein the groove is wedge-shaped.

7. A flat gasket according to claim 5, the groove is U-shaped.

8. A flat gasket according to claim 5, wherein there is at least one elevation (11) parallel to the opening rim.

9. A flat gasket according to claim 1, wherein the structure occupies at least one strip of predetermined width on said surface of the leg (5,6).

10. A flat gasket according to claim 1, wherein the structure occupies strips on said surface, the strips being juxtaposed in a spaced manner.

11. A flat gasket according to claim 1, wherein the structure is present at predetermined portions along the opening rim.

12. A flat gasket according to claim 1, wherein the structure is present on both U-legs (5,6).

13. A process for the production of a flat gasket in which a bent sheet metal strip is shaped to a U-shaped flange serving as a border for an opening in the gasket, wherein in one operation, with the formation of the border (4), there is also formed on one outer surface of the border a structure including at least one depression for receipt of an impregnating solution, and the depression is filled with the impregnating solution with an outwardly curved meniscus.

14. A process as claimed in claim 13 wherein said surface is provided with plural adjacent depressions each receiving the impregnating solution with an outwardly curved meniscus and wherein the menisci are subsequently flattened out after polymerization of the solution, to form a continuous bead seal.

* * * * *